March 10, 1970     L. O. MESENHIMER ET AL     3,500,166
INTEGRATED THREE PHASE INVERTER SYSTEM
Filed May 23, 1968     2 Sheets-Sheet 2
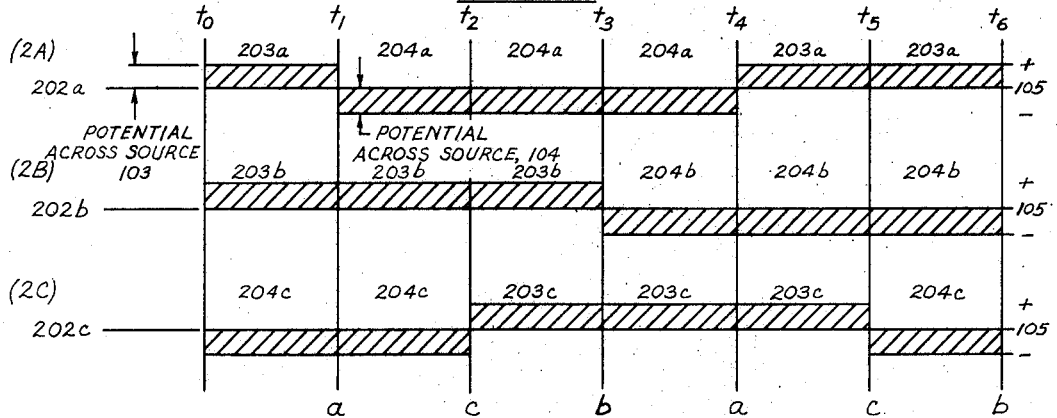
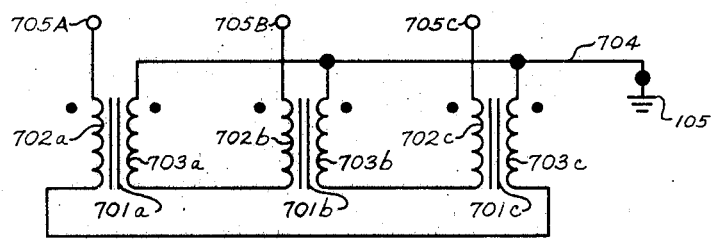
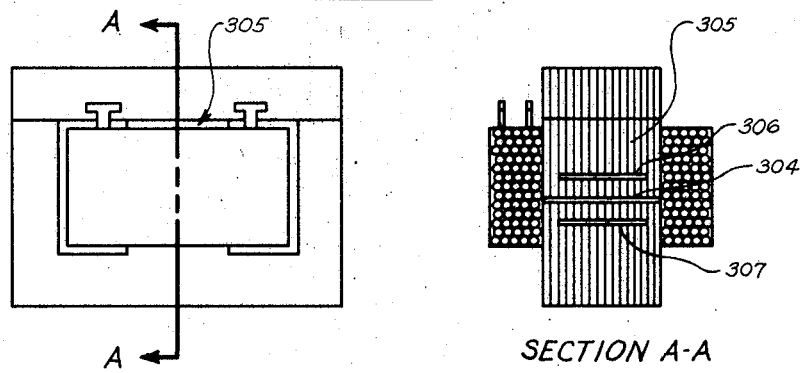
INVENTORS
THOMAS W. GRASMEHR
LEE O. MESENHIMER
BY United States Patent Office 3,500,166
Patented Mar. 10, 1970

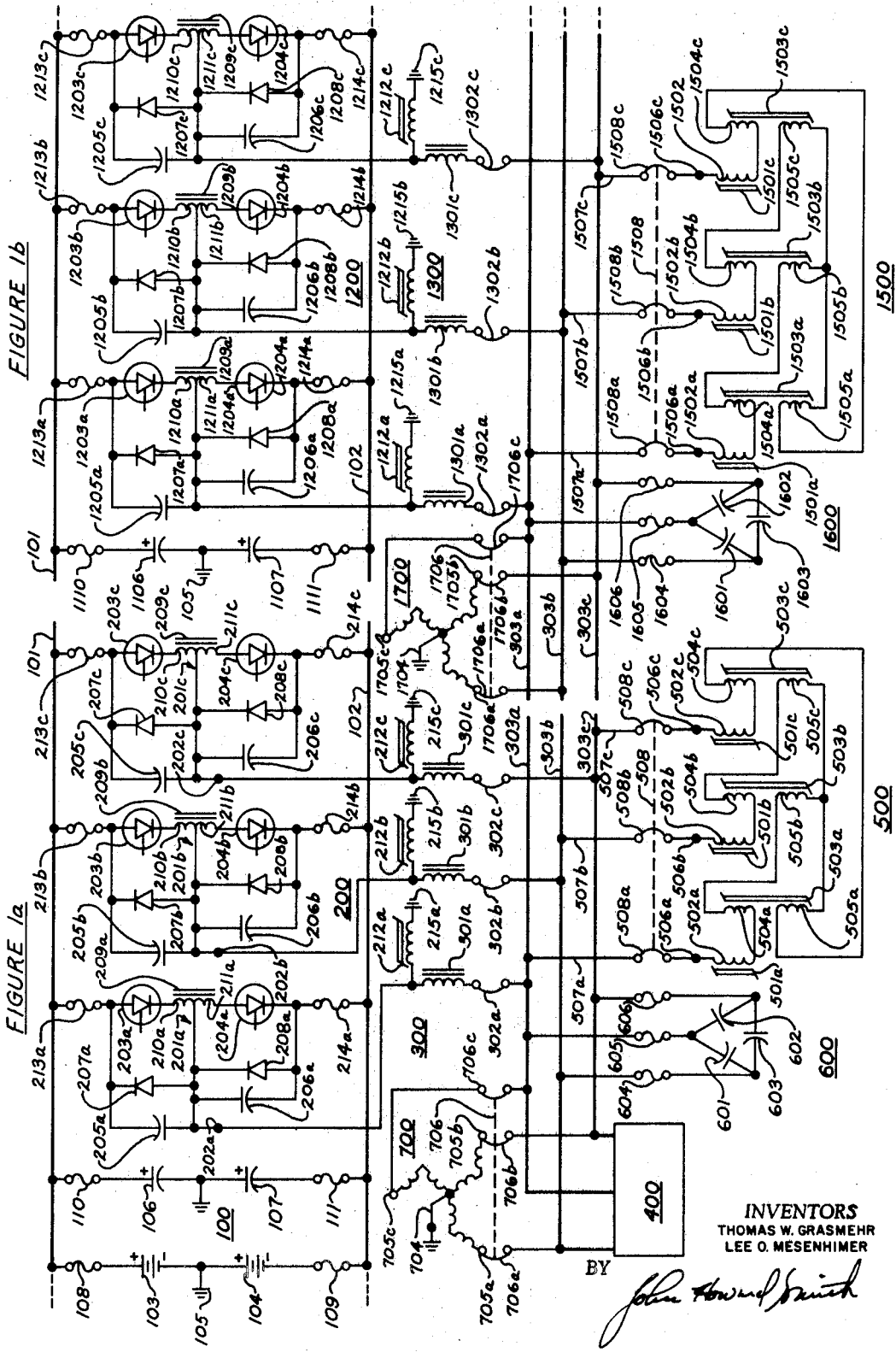

3,500,166
INTEGRATED THREE PHASE INVERTER SYSTEM
Lee Orland Mesenhimer, Lakewood, and Thomas W. Grasmehr, Rocky River, Ohio, assignors to Lorain Products Corporation, a corporation of Ohio
Filed May 23, 1968, Ser. No. 731,426
Int. Cl. H02m 1/18, 7/22; G02f 1/68
U.S. Cl. 321—11                          10 Claims

ABSTRACT OF THE DISCLOSURE

A polyphase, ferroresonant regulated inverter system comprising one or more polyphase inverter modules. Each inverter module includes phase generating and ferroresonant regulating component groups and circuitry for electrically disconnecting failed ones of the latter component groups in order that the non-failed component groups in each inverter module may coact with all other non-failed component groups in all other inverter modules to substantially maintain the rated output power of the system when a failure occurs in less than all component groups of a given type, suitable circuit means being provided to compensate for the electrical disconnection of one or more of the phase generating component groups.

The present invention relates to polyphase inverter systems and more particularly to those inverter systems using ferroresonant circuitry to contribute to highly reliable standby characteristics and to regulate and balance the output voltages of the inverter system under a wide variety of failure conditions.

Such an invention system may include one or more polyphase inverter modules, each module including a plurality of single phase inverter sections and other component groups contributing to the present invention.

Ferroresonant voltage regulators suitable for use in inverters are known to those skilled in the art. Also known is the use therein of polyphase poly-unit saturable reactors to maintain a sinusoidal output voltage waveform. Patent No. 3,139,577 granted to D. Krezek is an example of the application of a poly-unit saturable reactor to a polyphase ferroresonant regulator.

A past difficulty in the use of ferroresonant regulated inverters is that, while polyphase poly-unit saturable reactors used in combination with shunt capacitance and series inductance possess polyphase voltage regulating and balancing properties, the ability of the latter components to regulate and balance the output voltages of the inverter at full load suffers as the voltage imbalance to the ferroresonant regulating circuitry of the inverter is increased. If, for example, the inverter is operated from battery and suffers the loss of a phase, i.e. the failure of one or more of the plurality of phase generating circuits which carry out the initial conversion from DC to AC, the inverter will either be unable to supply the power requirements of the load, or be unable to maintain balanced polyphase load voltages, the power handling capability falling to approximately one-half of that for the case involving no phase loss. Thus an attempt to use such a system as a standby source for critical loads, in the case of AC line failure, is limited by reliability considerations.

Heretofore, another difficulty in the use of polyphase, ferroresonant regulated, inverters has involved problems arising from the failure of a portion of one of the plurality of phase generating circuits. The continued electrical presence of such a partially failed phase generating circuit has been found to cause the entire inverter to become harmfully unstable, often resulting in the opening of fuses in the remaining non-failing phase generating circuits and in serious inoperativeness of the load. Thus the reliability of the entire inverter has rested on the reliability of any one of a plurality of electronic components. This reliability renders the inverter of questionable value, since in large measure, inverter utility rests on its ability to maintain satisfactory, uninterrupted operation of a load should AC line power fail.

It has been the practice to improve the reliability of polyphase inverters by merely providing extra power handling capacity in redundant, parallel connected inverters. In such inverter systems, the loss of any part of an inverter caused the removal of that entire inverter from the inverter system, with the result that the power handling capability of the system was reduced. If, for example, the polyphase inverter system included two inverters each having at least three phase generating circuits, the failure of any essential component in any of the phase generating circuits caused the inverter containing that phase generating circuit to be disconnected from the load. Thus the power handling capability of the inverter system was reduced to one half of its original value since one half of the phase generating circuits were no longer contributing to the maintenance of load power. Users of inverter systems of this type were faced with the choice of having an inverter system including two inverters, each of power handling capacity equal to that of the load, with the full power handling capacity of an inverter being utilized only infrequently when one of the inverters failed, or of having an inverter system including one inverter of power handling capacity substantially equal to that of the load with the possibility of a failure which could, at any time, discontinue supplying any of the required load power.

Accordingly, it is an object of the invention to optimize the ability of a polyphase inverter system to meet the power requirements of a polyphase load under a variety of adverse conditions including the failure of one or more components or component groups.

It is a further object of the invention to provide inverter modules such that the addition thereto of other like inverter modules results in the electrical integration of component groups of one module with other similarly functioning component groups of other modules. Thus the addition of one or more inverter modules to an existing inverter module, in order to expand the rated output of the entire system, results in a unitary, integrated inverter system, each of the functions of which are performed by a plurality of similarly functioning component groups in the plurality of modules. With such an arrangement it will be seen that each of the respective component groups, in each of the inverter modules of the inverter system, contributes its respective function toward producing the output of the inverter system as a whole, instead of contributing its respective function solely toward producing the output of a particular inverter module.

It is still another object of the invention to provide an electrical arrangement in which the functions of failed component groups in one inverter module may be performed by respective, operative component groups of similar function in other inverter modules, to maintain uninterrupted power to the load by continuing to function in support of the operation of the inverter system, suitable means being provided to disconnect failed components or component groups to enhance this operation.

Accordingly, an inverter system built on the principles of the present invention will supply the polyphase power required by the load with a minimum of excess power handling capacity and a maximum of standby reliability. If, for example, such an inverter system includes two polyphase inverter modules, each having three single phase inverter sections, the failure of any component or component group in either of the inverter modules of the inverter system will not result in the loss of power generation from that entire inverter module. Instead, only the component group containing the failed component will be disconnected while all non-failing component groups in both inverter modules will continue to support the transmission of power to the load. If the disconnected, failed component group should be one of the six single phase inverter sections, it will be seen that two of the three single phase inverter sections in that module will continue to contribute to the maintenance of load power along with the three single phase inverter sections of the other module. In systems utilized heretofore, the failure of a component would disconnect the entire inverter module containing the failure, and thus, only three out of six phase generating circuits would be available to the inverter system output.

It is another object of the invention to improve the capability of a polyphase inverter system to maintain full load power in the presence of an imbalance introduced by the failure and disconnection of one or more of the single phase inverter sections, by providing power boosting transformer means whereby phase adjusting currents may be made available from the DC source to maintain proper phase relationship between operative single phase inverter sections to utilize more effectively the regulating and phase balancing properties of the ferroresonant regulating circuitry of the invention.

It is another object of the invention to provide ferroresonant regulating circuitry adapted for use in a polyphase inverter system, having current sensitive means for imparting greatly improved stability in meeting the power requirements of a changing load. These current sensitive means also serve to insure substantially equal division of the normal power conversion burden of the load among all the single phase inverter sections comprising a phase. This substantially equal load sharing between operative single phase inverter sections is however, aided by the power boosting transformer means when one or more of the latter inverter sections fail and become disconnected.

It is still another object of the invention to provide first disconnect means for the elimination of harmful instability effects resulting from failure of a portion of a single phase inverter section. More specifically there is herein provided first disconnect means having asymmetry correcting reactor means so arranged as to disconnect, within a predetermined time, a partially failed single phase inverter section thus isolating the latter within a particular inverter module.

Heretofore, standby power or redundancy has been accomplished by the provision of excess power packages which represent a direct duplication of a power package which, in itself, is of such a rating to drive the load in question. In other words, standby has been accomplished by the provision of a duplicate power supply to take over when the original power supply fails. Such a system is based upon a failure of the power supply package and its removal from the circuit with mere substitution of another, like package when failure of the first takes place.

While some character of standby power of redundancy has been a common and well known expedient to attain system reliability in the past, it has become more important with the advent for instance, of computers, and the requirements of reliable standby have become more rigid due to the fact that the entire inventory, data or manufacturing or processing operation of a business entity may now be dependent upon the dictates of a computer. Under these circumstances computer failure would result in the cessation of a critical and necessary function of a company.

These increasingly rigid requirements of standby and the high cost of redundancy by duplication, as practiced in the past, have made redundancy by mere duplication unsatisfactory in many applications as, for instance, in the computer field as explained above.

In accordance with the principles of the present invention there is provided an inverter standby system including one or more polyphase inverter modules each having an individual output rating of, for instance, 15 kva., these modules being arranged so that the outputs of any number thereof may be additively combined to permit future expansion of the system into which the original module or modules are installed.

Each module includes, in the presently disclosed three phase system, three single phase inverter sections together with additional component groups, to be more fully described presently, which component groups serve several functions; to regulate the output of the inverter system in which they are incorporated; to balance the line to line voltages of the inverter system in which they are incorporated; to balance the line to neutral voltages of the inverter system in which they are incorporated; to enable the above functions to be satisfactorily performed in a module in which two functioning single phase inverter sections remain after one single phase inverter section in that module fails to function; to enable the remaining two single phase inverter sections, in a module in which one such section is inoperative, to substantially maintain the rated output of that module; to enable the remaining two single phase inverter sections in any module to additively contribute to the output of any remaining inverter module or modules, thus substantially maintaining the rated output of the entire system and to enable operating component groups in one three phase inverter module to contribute their respective functions to another operating or other operating modules in the absence of like component groups in the latter module or modules.

Other objects and advantages will become apparent from the following description and accompanying drawings in which:

FIGURES 1a and 1b are schematic diagrams of connected exemplary polyphase inverter modules embodying the invention.

FIGURE 2 is a timing chart showing the voltages, with respect to ground, at selected points within the circuitry of the invention.

FIGURES 3 and 4 are drawings of magnetic structures utilized in practicing the invention.

Referring to the schematic diagram of a first polyphase inverter module in FIGURE 1a, there is shown a DC input means 100 energizing a polyphase inverter unit 200, the output of which is filtered by the combined activity of a reactor means 300 and a polyphase capacitive means 600. The regulation and balancing of the output voltage to the polyphase load 400 is accomplished under normal operating conditions by the action of a polyphase ferroresonant regulating arrangement including the reactor means 300, a polyphase capacitive means 600, and a polyphase poly-unit saturable reactor 500. A power boosting transformer means 700 allows effective ferroresonant regulating activity to continue when one or more portions of the polyphase inverter unit 200 have failed.

Referring to the schematic diagram of a second polyphase inverter module in FIGURE 1b, it will be seen that there is shown a module substantially identical to that of FIGURE 1a, but having corresponding components and component groups therein distinguished from those of FIGURE 1a by a prefix numeral "1." The second inverter module, as will be discussed more fully presently, is representative of one or more polyphase inverter modules intended for operation in parallel with the previously mentioned first inverter module if a larger output is required than that available from a single inverter module. It will be understood that the operation of the circuitry of FIGURE 1b is similar to that of FIGURE 1a.

Referring more particularly to the DC input means 100 of FIGURE 1a, there is shown a positive bus 101 and a negative bus 102 which serve to supply DC energy to all of the inverter modules of the inverter system. Between the latter busses there are connected a pair of substantially equal source of DC energy such as batteries 103 and 104. To the end that a path may be provided for the flow of phase adjusting currents from the latter sources of DC energy to the ferroresonant regulating circuitry should one or more portions of the polyphase inverter unit 200 fail, as will be explained more fully presently, there is provided a ground lead 105 between DC sources 103 and 104. If the voltage across each of the DC sources 103 and 104 requires filtering capacitors 106 and 107 may be connected respectively between the positive bus 101 and ground lead 105, and negative bus 102 and ground lead 105.

Suitable fuses 110 and 111 or the like may be provided to disconnect capacitors 106 and 107 if shorts should occur therein. Fuses 108 and 109 or the like may be provided to protect DC energy sources 103 and 104 in the event of catastrophic faults such as the accidental shorting of the positive and negative busses.

The polyphase inverter unit 200 includes three single phase inverter sections 201a, 201b and 201c. These single phase inverter sections are component groups that serve to generate respective phases of a three phase square wave voltage with respect to ground 105 at single phase inverter section outputs 202a, 202b and 202c. Those components and component groups bearing an "a" suffix generate phase A. Similarly those components and component groups bearing "b" and "c" suffixes generate phases B and C respectively. The latter three phase square wave voltage, after suitable waveshaping, regulating and balancing by other component groups as will be explained presently, is applied to a three phase load as the contribution of the first polyphase inverter module.

The conversion from DC to AC is carried out in the present embodiment by a controlled succession of thyristor conduction states in each of the single phase inverter sections of the inverter system in response to a predetermined succession of control signals from a suitable gating signal generator not shown. Such a gating signal generator may include synchronized gating signal generators in each of the inverter modules of the inverter system or equivalently a single master gating signal generator of a capacity sufficient to drive the appropriate thyristors in each inverter module concurrently. Any means of generating the sequence of gating pulses, which sequence will be described presently, is adequate for purposes of the invention.

In order that DC to AC energy conversion may be achieved, there is provided in the single phase inverter section 201a of the polyphase inverter unit 200 a pair of switch means such as thyristors 203a and 204a. The gate electrodes of the latter thyristors are coupled to appropriate outputs of a suitable gating signal generator. In order to initiate a reversal in the conduction states of thyristors 203a and 204a each time a gating signal is applied to the then non-conducting thyristor, there are provided respective capacitors 205a and 206a which accomplish commutation in conjunction with diodes 207a and 208a and a commutating transformer 209a, having essentially equal magnetically coupled windings 210a and 211a.

As will be described presently, the turn-off of the conducting thyristor depends on the turn-on of the non-conducting thyristor. Thus, if for some reason the non-conducting thyristor does not turn on, the conducting thyristor will not turn off and the resulting uninterrupted conduction of either thyristor 203a or 204a will introduce an unstabilizing DC level into the outputs of the polyphase inverter unit 200, making them unsymmetrical with respect to ground 105.

Accordingly, a first disconnect means, including such components as current responsive disconnect elements 213a and 214a, and asymmetry correcting reactor means 212a, is provided for each of the single phase inverter sections of the inverter system. The provision of a first disconnect means insures that within a predetermined time after the opening of either of the current responsive disconnect elements in any single phase inverter section, the resulting uninterrupted conduction of a thyristor in that single phase inverter section will be eliminated by the opening of the remaining current responsive disconnect element therein in a manner to be discussed presently with respect to single phase inverter 201. Although other devices as, for example, a current responsive disconnect means having a pair of mutually coordinated contacts capable of performing the function of said first disconnect means are well known to those skilled in the art, the above named arrangement of current responsive disconnect elements and asymmetry correcting reactor means was found operative and useful.

Because the switching activity of single phase inverter sections 201b and 201c and that of single phase inverter sections in other modules are substantially identical to that of single phase inverter section 201a, except for successive one third cycle delays between phases A, B and C thereof, the operation of the latter single phase inverter sections will be understood from the following discussion of the operation of single phase inverter section 201a.

Assuming, for purposes of description that thyristor 203a is conducting and thyristor 204a non-conducting, the capacitor 205a will have negligible voltage thereacross while the capacitor 206a will be charged to a voltage approximately equal to full DC supply voltage. If, then, a gating signal initiates conduction in thyristor 204a, the capacitor 206a will discharge through the forward path of the latter thyristor inducing a positive voltage on the top of winding 211a as shown in FIGURE 1a.

Because of the phasing of the winding 210a with respect to winding 211a, there is induced, by transformer action, a positive voltage on the top of winding 210a as shown in FIGURE 1a reverse biasing thyristor 203a and rendering it non-conducting. Further, the non-conduction of thyristor 203a allows the charging of capacitor 205a to near full DC supply voltage. Thus, a gating pulse to the non-conducting thyristor initiates a reversal in the conduction states of the two thyristors and the charged states of their respective commutating capacitors. The diodes 207a and 208a serve to prevent harmful voltages from appearing across the power electrodes of the respectively associated thyristors.

Since the forward voltage drop acros a conducting thyristor is negligible, it will be seen that the output junction 202a of phase A will be connected to positive bus 101, which, in turn, is at a potential positive from ground 105, when thyristor 203a conducts. Therefore, since the ground connection 215a and ground 105 are common, the voltage across the DC supply 103 appears across asymmetry correcting reactor 212a, with a polarity which is positive on the left as shown in FIGURE 1a.

Similarly, during a later portion of the switching cycle of phase A when thyristor 204a conducts, the output junction 202a will be connected to the negative bus 102, which, in turn, is at a potential negative from ground 105, by the potential across DC supply 104. Thus, the voltage across the DC supply 104 appears across asymmetry correcting reactor 212a with a polarity which is negative on the left.

As a result of the application, for essentially equal periods of time, of substantially equal voltage of opposite polarity across asymmetry correcting reactor 212a, there will be no appreciable DC current therein and the latter reactor will have little effect on the normal operation of the circuitry because of its large reactance.

Referring to FIGURE 2A, $t_0$ represents the assumed starting time and $t_6$ represents the completion time of a switching sequence for phase A which repeats regularly thereafter. It will be seen that a gating pulse to the non-conducting thyristor of single phase inverter 201a, as indicated by the letter "a" at the lower end of time line $t_1$, initiates a reversal in the conduction states of thyristors 203a and 204a with the indicated reversal in the voltage, with respect to ground 105, of output junction 202a. At a later time, $t_4$ in the switching cycle $t_4$, a second gating pulse to phase A returns the thyristors therein to their original conduction states. Thus the properly timed application of the two above mentioned gating pulses completes an entire cycle for phase A and results in a time variation of the voltage at junction 202a with respect to ground as shown in FIGURE 2A.

The corresponding activity, occurring in single phase inverter sections 201b and 201c, is illustrated in FIGURES 2B and 2C respectively. Thus, the sequential application of gating pulses to non-conducting thyristors in single phase inverter sections 201a, 201b and 201c will result in the generation of three symmetrical square wave voltages with respect to ground 105 at the single phase inverter section outputs 202a, 202b and 202c. The remaining component groups of the invention serve to filter the fundamental components from the latter polyphase square wave, and balance, regulate and supply them to the polyphase load in a manner imparting improved standby reliability thereto.

In accordance with an object of the invention whereby partially failed single phase inverter sections are disconnected from the DC power source before their presence produces harmful instability effects upon the polyphase load, a first disconnect means having an asymmetry correcting reactor is included in each single phase inverter section of the inverter system. The operation of the first disconnect means in conjunction with single phase inverter section 201a will now be described. If thyristor 203a and 204a should conduct at the same time, a near short circuit would be present across DC voltage supplies 103 and 104 causing a surge of current through both current responsive disconnect elements 213a and 214a. Under these circumstances it is likely that only one of the latter disconnect elements will open, since the opening of the first would prevent the opening of the second. Because only one of the thyristors 203a and 204a will be disconnected from the DC busses 101 and 102 by the opening of one of the disconnect elements 213a and 214a, and because both thyristors 203a and 204a are required for proper commutation of either, it will be seen that the one of the latter thyristors still connected to a DC power bus cannot be turned off.

If asymmetry correcting reactor 212a were not present in the circuit at this time, the uninterrupted conduction of either of the thyristors 203a or 204a would introduce an unstabilizing DC level into the outputs of polyphase inverter unit 200 causing the voltages at the latter outputs to lose their symmetry with respect to ground 105.

If, however, the asymmetry correcting reactors 212a, 212b and 212c are provided, the uninterrupted conduction of either thyristor in any of the phases will cause a prolonged application of a DC voltage across the asymmetry correcting reactor of that phase. As a result, a DC current will flow in the latter reactor and the flux density in the magnetic core thereof will increase toward its saturation value. The magnetization characteristic of each asymmetry correcting reactor is such that a substantial DC current will flow therethrough to open the unopened disconnect element and to isolate the failed single phase inverter section before a disturbance is detected at the polyphase output terminals. It should be noted that although the asymmetry connecting reactors insure rapid isolation of failing single phase inverters, a smaller contribution to such activity is made by the windings of the power boosting transformer 700 which are connected from the polyphase output conductors to ground lead 105. Thus, the unstabilizing DC current level in the subsequent circuitry will be removed and there can begin activity compensating for the imbalance resulting from the loss of a single phase inverter section.

Under these conditions and as will be shown presently, the remaining operative component groups in the inverter module containing the disconnected single phase inverter section, as well as those operative component groups in all other inverted modules of the inverter system, will continue functioning to contribute to the maintenance of polyphase load power.

Under conditions of normal operation, however, the three outputs of the polyphase inverter unit 200 supply polyphase power to the reactor means 300 of the ferroresonant regulating arrangement of the invention. The latter reactor means includes in the presently disclosed embodiment current sensitive means 301a, 301b and 301c. Also included therein are current responsive disconnect means 302a, 302b and 302c which serve to connect current sensitive means 301a, 301b and 301c to the load 400 through the respective polyphase output means comprising conductors 303a, 303b and 30c. It will be understood that these same polyphase output conductors serve to connect together respective outputs of all of the inverter modules of the inverter system.

The use of fixed, linear reactors or chokes, in the place of the instant current sensitive means 301a, 301b, 301c, is well known. Linear reactors have previously been utilized in a dual role. First, such reactors contributed to the filtering of the output voltage waveform by providing increased impedance to undesired harmonic frequencies. Secondly, these linear reactors acted in conjunction with the other voltage regulating elements of earlier inverter systems to absorb the variable different in voltage between the output voltages of the phase generating circuits and the three phase output voltages.

Circuitry utilizing polyphase poly-unit saturable reactor in ferroresonant regulating circuitry have, however, been found to be harmfully unstable at light loads if the fixed reactors described above were not made high in inductance value. Because these same fixed reactors were required to carry full load current, the current rating thereof had to be high. The combination of high current and high inductance meant not only large size and cost but also high reactive voltages. Such high reactive voltages mean less available power output.

In order to avoid these difficulties, current sensitive means 301a, 301b and 301c are provided. Each of the latter reactors affords a high inductance for low values of reactor current and a lower predetermined value of inductance for operation at full load current. Thus, there is herein provided a high series inductance for stabilizing inverter operation at light loads and a lower inductance at full load current, permitting the reactor to be substantially lower in size and cost than earlier fixed reactors for a given power conversion requirement.

Such current sensitive means may be made with a core built up of butt joined E-I type laminations having a plurality of air gaps of varying size as shown in FIGURE 4. The central air gap 304 cuts entirely across the central leg 305 of the core, while the flanking gaps 306 and 307 provide an air gap for all laminations except the outside few. It will be understood that many similar combinations or arrangements of air gaps can be adapted to serve the same function of providing a magnetic core of predetermined non-linearity and that the above described configuration is one such arrangement found useful and operative.

One of the component groups contributing to the ferroresonant regulation of the inverter system output includes the polyphase capacitive means 600. The latter capacitive means may include three single phase capacitors 601, 602 and 603 which may be connected across the three phase lines 303a, 303b and 303c in either the Y or the Δ configuration. Third current sensitive disconnect means 604, 605 and 606 are provided to isolate portions of the polyphase capacitive means should failure thereof occur.

One of the purposes of the polyphase capacitive means 600 is the provision of filtering for the three phase output voltage to supplement the filtering provided by the current sensitive means 301a, 301b, 301c. A second purpose of the letter capacitive means is the contribution thereof to ferroresonant regulating activity when properly connected with current sensitive means 300 and poly-unit saturable reactor means 500 to be more fully described presently.

As a result of the filtering provided by polyphase capacitive means 600 and reactor means 300 there is established between the three phase output conductors 303a, 303b and 303c an unregulated but substantially sinusoidal three phase voltage. It will be seen that since the latter named output conductors are common to the outputs of all inverter modules, the three phase shunt capacitance located in the first inverter module contributes to the filtering of all of the inverter modules of the inverter system.

In order that the three phase line voltages between the polyphase output conductors may be balanced and regulated without the introduction of appreciable amounts of harmonic distortion, there is provided in each inverter module the component group comprising a polyphase poly-unit saturable reactor 500. The poly-unit reactor of the first inverter module includes saturable reactors 501a, 501b and 501c having respective windings 502a, 502b and 502c; and saturable core transformers 503a, 503b and 503c having respective, mutually coupled winding pairs 504a and 505a, 504b and 505b and 504c and 505c interconnected as shown in FIGURE 1a. Output terminals 506a, 506b and 506c are provided for the saturable reactors 501a, 501b and 501c respectively in order that they may be connected to the polyphase output lines 303a, 303b and 303c by the respective conductors 507a, 507b and 507c.

Each of the above mentioned mutually coupled winding pairs in the poly-unit saturable reactor 500 has component windings of essentially equal numbers of turns of opposite phasing, and all of the latter winding pairs have substantially equal numbers of turns. If the voltage waveform between conductors 303a, 303b and 303c is to approach a sine wave, then the number of turns on saturable reactor cores 501a, 501b and 501c preferably should be substantially equal to the number of turns in any of the windings on the saturable core transformers mentioned above multiplied by the square root of three, assuming all cores in poly-unit reactor 500 have substantially the same cross-sectional area.

In accordance with a feature of the present invention whereby failed component groups are disconnected before their presence detrimentally affects the operation of non-failed component groups, a second coordinated current responsive disconnect means 508 or the like having contact pairs 508a, 508b and 508c is provided. The contact pairs of the latter disconnect means are connected in series with the respective conductors 507a, 507b and 507c to prevent a failure condition whereby the symmetry and stability of the three phase output is lost due to the disconnection of one or two phases of the poly-unit reactor in the first inverter module. Such a disconnection of one or two of the conductors corresponding to 507a, 507b and 507c in any of the inverter modules may lead to a harmfully unstable condition and results in an interruption of the power transmission to the load. Since an output failure of this kind cannot be tolerated in an uninterruptible power system, the entire component group comprising poly-unit reactor 500 is removed as the second coordinated current responsive disconnect means 508 initiates a substantially simultaneous disconnection of all three conductors 507a, 507b and 507c.

As a result of such a disconnection of poly-unit reactor 500 of the inverter module of FIGURE 1a, other polyphase poly-unit reactors, such as 1500 in inverter modules connected in parallel therewith, by means of the polyphase output conductors 303a, 303b and 303c, will increase their voltage regulating activity to compensate for the loss of poly-unit reactor 500. In this manner an interruption in the power transmission to the load is prevented. It will be seen that non-failing component groups 100, 200, 300, 400, 600 and 700 of the inverter module of FIGURE 1a will continue to function as integral parts of the inverter system in the absence of poly-unit reactor 500.

Thus, as will become increasingly evident, in contrast with earlier modular inverter systems wherein an inverter module was completely removed as a unit when any of its component groups failed, the present invention provides for continued operation of the non-failing component groups in all the various inverter modules. This feature allows component groups or combinations of component groups in any or all inverter modules to become inoperative and isolated while all of the non-failing, non-isolated component groups therein, continue to function with all the operative component groups in the various inverter modules to maintain uninterrupted power transmission to the polyphase load. Thus each component group, though physically located in a particular inverter module, is an integral part of all of the inverter modules in the inverter system. In other words, when a plurality of inverter modules embodying the invention are connected as herein shown, the component groups of each module lose their identity with respect to a particular module and instead function as a part of the inverter system as a whole.

The normal operation of the poly-unit saturable reactor 500 will now be described with reference to the first inverter module. The application of a three phase source to the instant poly-unit reactor configuration will result in successive periods of unsaturation for each of the cores therein as they pass from saturation in one magnetic direction to saturation in the opposite direction during the first half cycle of the applied voltage. Continued application of a three phase source to the poly-unit saturable reactors will result in further periods of unsaturation for each of the cores as they return to their original condition during the second half cycle of the applied voltage.

As is well known, the current in a saturable reactor can be considered negligible when the core is unsaturated. Upon saturation, however, the net current is limited substantially by the saturated reactance of the windings and the series impedance of circuitry in which the saturated reactor is connected. Thus, as each of the cores in turn unsaturate, during a given half cycle, the net current therein approaches zero and there are successively produced six values of current in each of the lines 507a, 507b and 507c corresponding to the six successive arrays of saturated impedances which are determined by the then unsaturated core. The same electrical activity takes place in the succeeding half cycle of the applied voltage but in the opposite sense. This succession of 12 values of current in each of the conductors 507a, 507b and 507c provides a substantially sinusoidal wave of current in each of the latter conductors. Other poly-unit saturable reactors having larger numbers of magnetic elements may be used to more closely approach a sinusoidal waveform.

The above described poly-unit reactor 500 has the ability in ferroresonant use, to maintain substantially constant or regulated voltage at the load when connected so as to constrain the current in conductors 507a, 507b and 507c to a sinusoidal waveform. Further, the polyphase poly-unit saturable reactor has line to line voltage balancing properties. Thus, if the voltage output of a single phase inverter section is not the same as that of any of the remaining single phase inverter sections of the invention, the voltage imbalance between the poly-phase output conductors will be smaller than the voltage imbalance between the output junctions, such as 202a, 202b and 202c, of the various polyphase inverter units. It is apparent that because the polyphase output conductors 303a, 303b and 303c are common to all inverter modules, each poly-unit reactor in each inverter module performs its function for all inverter modules of the inverter system notwithstanding the location of that poly-unit reactor in a particular inverter module.

As the imbalance to be compensated for in devices of the above character increases, however, the effectiveness of the phase balancing property of the ferroresonant regulating circuitry decreases. Heretofore in the extreme case, that is, when an entire phase failed, the inputs to the ferroresonant regulator circuitry attained single phase waveform from which the required polyphase load voltages could not be generated with any substantial current capability.

The seriousness of the loss of an inverter phase when no power boosting transformer means is provided will be clear from the following example involving an inverter system comprising a single inverter module. Assuming that phase A is disconnected by the opening of the current responsive disconnect elements 214a and 213a, there will be several portions of the switching cycle which are particularly disturbed. The first of these disturbed periods arises during that portion of the switching cycle when current normally flows toward the load through thyristor 203a and returns through thyristors 204b and 204c. A similar disturbance arises when thyristors 203b and 203c are conducting current toward the load, a return path for the latter current normally being provided through thyristor 204a. Because thyristors 204a and 203a are prevented from conducting by the opened disconnect elements 213a and 214a, it will be seen that during the above described portions of the switching cycle, there can be no current therefrom to the ferroresonant regulating component groups.

Additionally, during that portion of the switching cycle when current toward the load would normally be shared by thyristor 203a and another, or when the return current from the load would normally be carried by thyristor 204a and another, it will be seen that such current sharing will no longer be possible. Thus the current toward the load through a conducting thyristor in one of the operative single phase inverter sections will be constrained to return through the conducting thyristor in the remaining operative single phase inverter section. Hence, the phase relationship between the currents of the operative single phase inverter sections will be 180° instead of the desired 120°.

In accordance with the present invention and to overcome the above described difficulties, component groups comprising power boosting transformer means such as 700 are provided in each inverter module to maintain proper 120° phase relationships between the outputs of operative single phase inverters so that ferroresonant regulating component groups may effectively compensate for the loss of one or more of the single phase inverter sections comprising a phase.

The three phase transformer arrangement shown in FIGURE 3 is illustrative of a structure found suitable for purposes of attaining one of the advantages of the present invention. One feature of the transformer arrangement shown in FIGURE 3, involves the provision of a polyphase neutral conductor means whereby phase adjusting currents from the DC source may be made available to the ferroresonant regulating component groups in the event of the loss of a single phase inverter section in one or more of the inverter modules. Under normal operating conditions, however, each power boosting transformer arrangement serves to establish balanced line to neutral, or ground, voltages from the balanced and regulated line to line voltage between polyphase output conductors 303a, 303b and 303c. Thus if exclusive line to line loading of the output were used, the latter transformers would have little effect on normal circuit operation.

Included in the power boosting transformer arrangement 700 of FIGURE 3 are three transformers 701a, 701b and 701c. These transformers are connected in a configuration known as zig-zag. The component transformers of the power boosting means 700 are provided with respective primary windings 702a, 702b and 702c having respective polyphase terminal means 705a, 705b and 705c. Also provided therein are secondary windings 703a, 703b and 703c which are in turn commonly connected to a polyphase neutral conductor 704. The polyphase neutral conductor serves as a means for connecting the neutral of the polyphase output voltage established by power boosting transformer means 700 to ground 105. It will be understood that the transformer arrangement herein shown is for illustrative purposes only, and that other transformer arrangements for accomplishing the purposes of the invention are available to those skilled in the art.

Again referring to FIGURE 1a a fourth, coordinated current responsive disconnect means 706 or the like having contact pairs 706a, 706b and 706c connects the respective polyphase terminal means 705a, 705b and 705c to the three phase output conductors 303a, 303b and 303c.

The fourth, coordinated current responsive disconnect means 706 serves to accomplish the substantially simultaneous opening of contact pairs 705a, 705b and 705c when any one or two of the latter contact pairs becomes opened because of a failure in a portion of power boosting transformer 700. In this manner the imbalanced line to ground voltages caused by one or two disconnected transformers in the power boosting transformer 700 are preventing from interrupting the power transmission to the load. Following the disconnection of power boosting transformer 700, in an inverter module of FIGURE 1a, the functions thereof are carried on by other power boosting transformers such as 1700 in the remaining inverter modules of the inverter system.

The reliability enhancing operation of the power boosting transformer 700 will now be described. Assuming that there exists a severe failure condition whereby all of the single phase inverter sections of phase A, in all inverter modules of the inverter system, have been disconnected by the activity of current responsive disconnect elements and asymmetry correcting reactors, there would exist, in the absence of a power boosting transformer arrangement, a phase relationship of substantially 180° between the outputs of the single phase inverter sections of phase B and C as explained previously. The effect of such a failure condition on the output is substantially that produced when the ferroresonant regulating component groups of the various inverter modules are driven with a single phase voltage. The effect of such single phase drive is a reduction, to at best fifty percent of normal, of polyphase output power.

If, however, under the same failure condition, component groups such as power boosting transformer 700 are provided in the various inverted modules, there are initiated phase adjusting currents, through ground lead 105 and conductor such as 704, which allow the phase displacement between the outputs of phases B and C to be maintained at substantially 120°. The effect of such a failure condition on the three phase output of the circuitry of the invention is substantially the same as that produced when the ferroresonant regulating component groups of the various inverter modules are driven with two single phase line to ground voltages 120° out of phase.

The ability of the ferroresonant regulator component groups in the various inverter modules to provide a set of balanced three phase voltages of substantial current capability from the latter two single phase voltages is greatly improved over the ability of the same ferroresonant regulating component groups to generate a set of balanced three phase voltages from the earlier named single phase voltage. Thus the output disturbance caused by the loss of an entire inverter system phase is greatly reduced by the presence of power boosting transformer means 700.

If the inverter system failure is not as severe as the loss of an entire phase, but instead constitutes the failure of less than all of the single phase inverted sections included therein, the loss in polyphase output power is even further reduced by the action of power boosting transformers such as 700 in each of the modules of the inverter system.

Due to the symmetrical structure of the power boosting transformer 700, it is apparent that the latter transformer arrangement will serve the same reliability enhancing function for failures in phases B and C of the inverter system, as that described for phase A. Additionally, the power boosting transformers in the various inverter modules will collectively contribute their beneficial phase adjusting activity when a plurality of single phase inverter sections of different phases fail. Thus the power boosting transformers of the various inverter modules contribute substantially to the maintenance of polyphase output power for a wide variety of kinds and degrees of polyphase inverter unit failure.

Since the primary windings of the power boosting transformer arrangement in the various inverter modules are commonly connected by the respective polyphase output conductors, it will be seen that each of the latter transformer arrangement performs its function for all of the inverter modules of the inverter system notwithstanding its location within a particular inverter module.

Thus it will be seen that there has been disclosed a polyphase inverter module consisting of a plurality of component groups so arranged that a failed single phase inverter section or a portion thereof does not interfere with the maintenance of a stable, regulated, and balanced set of output voltages with substantial current capability. It will further be seen that there has been disclosed an inverter system made up of two or more of such inverter modules, each module consisting of a plurality of component groups so arranged that when two or more inverter modules are connected in power aiding relationship, failure of individual component groups will not disable the remaining portions of the inverter module but will instead utilize those component groups wherein no failure has occurred in conjunction with the operative component groups of all inverter modules to maintain the polyphase load power. With such an arrangement it will be seen that although individual sections of an inverter module have failed, the remaining sections and component groups thereof will still function in their normal manner to support the functioning of the remaining inverter modules. Under these circumstances there is avoided the loss of an entire polyphase inverter module. It will be understood that the embodiment shown herein is for explanatory purposes only and may be changed or modified without departing from the spirit and scope of the invention.

What is claimed is:

1. In an inverter system for energizing a polyphase load, in combination, DC input means including a positive bus, a negative bus and a ground lead connected electrically therebetween, polyphase output means, a plurality of polyphase inverter modules, means for electrically connecting each of said modules in power aiding relationship between said DC input means and said polyphase output means, a plurality of single phase inverter sections in each said polyphase inverter module, said inverter sections each including a plurality of switching means having unidirectional conducting characteristics and being arranged to alternately and severally conduct to apply an AC signal to said polyphase output means, a plurality of first disconnect means, means for connecting each of said single phase inverter sections in electrical parallel relationship across said positive and negative busses, said last named connecting means including respective ones of said first disconnect means, a plurality of reactor means, means for connecting a first end of each of said reactor means to respective ones of said single phase inverter sections, means for connecting the other end of each of said reactor means to respective polyphase output means, polyphase poly-unit saturable reactor means in each of said polyphase inverter modules, second current responsive disconnect means, means for connecting each of said polyphase poly-unit saturable reactor means across said polyphase output means, said last named connecting means including said second current responsive disconnect means, polyphase capacitive means in each of said inverter modules, third current responsive disconnect means, means for connecting each of said polyphase capacitive means across said polyphase output means through said third current responsive disconnect means, power boosting transformer means in each of said inverter modules, said power boosting transformer means including polyphase terminal means and polyphase neutral conductor means, fourth current responsive disconnect means, means for connecting respective ones of said polyphase terminal means of each of said power boosting transformer means to said polyphase output means through said fourth current responsive disconnect means, means for connecting each of said polyphase neutral conductor means to said ground lead of said DC input means, said first, second, third and fourth disconnect means being arranged to respectively, electrically disconnect failed ones of said single phase inverter sections, said polyphase poly-unit saturable reactor means, said polyphase capacitive means, and said power boosting transformer means, from said DC input means and from said polyphase output means whereby respective non-failed ones of said single phase inverter sections, polyphase saturable reactor means, polyphase capacitive means, and power boosting transformer means in all inverter modules continue to energize the polyphase load.

2. An inverter system as set forth in claim 1 in which said reactor means comprises current sensitive means, each of said current sensitive means being provided with a magnetic core of predetermined non-linearity whereby a first value of inductance is established for substantially no-load current through said current sensitive means, and whereby a second, lower value of inductance is established for substantially full-load currents through said current sensitive means.

3. An inverter system as set forth in claim 1 in which each of said first disconnect means comprises asymmetry correcting reactor means and a plurality of current responsive disconnect elements, means for connecting respective ones of said current responsive disconnect elements to said switch means, each of said asymmetry correcting reactor means being connected between respective ones of said single phase inverter sections and said ground lead to open a respective second one of said plurality of current responsive disconnect elements within a predetermined time after the current responsive opening of a first respective one of said current responsive disconnect elements.

4. An inverter system as set forth in claim 3 in which said reactor means comprises current sensitive means, each of said current sensitive means being provided with a magnetic core of predetermined non-linearity whereby a first value of inductance is established for substantially no-load currents through said current sensitive means and whereby a second lower value of inductance is established for substantially full-load currents through said current sensitive means.

5. In a polyphase inverter for energizing a polyphase load, in combination, DC input means including a positive bus, a negative bus and a ground lead connected electrically therebetween, polyphase output means, a plurality of single phase inverter sections each including a plurality of unidirectional switch means, said unidirectional switch means being arranged to alternately and severally conduct to energize a load, first disconnect means, means for connecting each of said single phase inverter sections across said positive and negative busses, said connecting means including said first disconnect means, a plurality of reactor means, means for connecting a first end of each of respective reactor means to respective single phase inverter sections, means for connecting the other end of each of said reactor means to respective polyphase output means, polyphase, poly-unit saturable reactor means, means for connecting said polyphase, poly-unit saturable means across said polyphase output means, polyphase capacitive means, means for connecting said polyphase capacitive means across said polyphase output means, power boosting transformer means having polyphase terminal means and polyphase neutral conductor means, means for connecting said polyphase terminal means to respective polyphase output means, means for connecting said polyphase neutral conductor means to said ground lead of said DC input means, said power boosting transformer means being adapted to substantially maintain the polyphase load when a failed one of said plurality of single phase inverter sections becomes disconnected from said inverter by a respective one of said first disconnect means.

6. A polyphase inverter as set forth in claim 5 in which said reactor means comprises current sensitive means, each of said current sensitive means being provided with magnetic core means of predetermined non-linearity whereby a first value of inductance is established for substantially no-load currents through said current sensitive means and a second lower value of inductance is established for substantially full-load currents through said current sensitive means.

7. A polyphase inverter as set forth in claim 5 in which each of said first disconnect means comprises asymmetry correcting reactor means and a plurality of current responsive disconnect elements, means for disconnecting respective ones of said current responsive connect elements to said switch means, said asymmetry correcting reactor means being connected between respective ones of said single phase inverter sections and said ground lead to open a respective second one of said plurality of current responsive disconnect elements within a predetermined time after the current responsive opening of a first respective one of said current responsive disconnect elements.

8. A polyphase inverter as set forth in claim 7 in which said reactor means comprises current sensitive means, each of said current sensitive means being provided with magnetic core means of predetermined non-linearity whereby a first value of inductance is established for substantially no-load currents through said current sensitive means and whereby a second lower value of inductance is established for substantially full-load currents through said current sensitive means.

9. In an inverter system or the like of the type utilizing ferroresonant voltage regulation, the combination of AC input means, AC output means, means for connecting an AC load across said AC output means, polyphase, poly-unit saturable reactor means, means for connecting said polyphase, poly-unit saturable reactor means across said AC output means in parallel relationship to the AC load, capacitive means, means for connecting said capacitve means across said AC output means in parallel relationship to the AC load, current sensitive means having magnetic core means of predetermined non-linearity, means for serially connecting said current sensitive means between said AC input means and said AC output means, said current sensitive means providing a first value of inductance for substantially no-load currents therethrough and a second, lower value of inductance for substantially full-load currents therethrough.

10. In a polyphase inverter system the combination of positive and negative DC busses and a ground lead connected electrically therebetween, first and second switch means each having first and second power electrodes and a control electrode, first and second current responsive disconnect elements, means for connecting said first power electrode of said first switch means to said positive DC bus through said first current responsive disconnect element, means for connecting said second power electrode of said second switch means to said negative DC bus through said second current responsive disconnect element, output means for connecting said second power electrode of said first switch means to said first power electrode of said second switch means, said first and second switch means being arranged to alternately and severally conduct in response to control signals impressed on respective ones of said control electrodes to produce respective positive and negative output voltages between said ground lead and said output means, asymmetry correcting reactor means having a magnetic core of predetermined non-linearity, means for connecting said asymmetry correcting reactor means between said ground lead and said output means to impress said output voltage thereacross whereby when one of said current responsive disconnect elements opens, said asymmetry correcting reactor means conducts a DC current sufficient to open the remaining current responsive disconnect element.

References Cited

UNITED STATES PATENTS

| | | | |
|---|---|---|---|
| 3,139,577 | 6/1964 | Krezek | 323—102 |
| 3,351,841 | 11/1967 | Lipman et al. | 307—82 X |
| 3,424,995 | 1/1969 | Parenti | 307—64 X |

LEE T. HIX, Primary Examiner

W. H. BEHA, JR., Assistant Examiner

U.S. Cl. X.R.

321—27; 323—102; 307—64